United States Patent Office 3,081,426
Patented Mar. 12, 1963

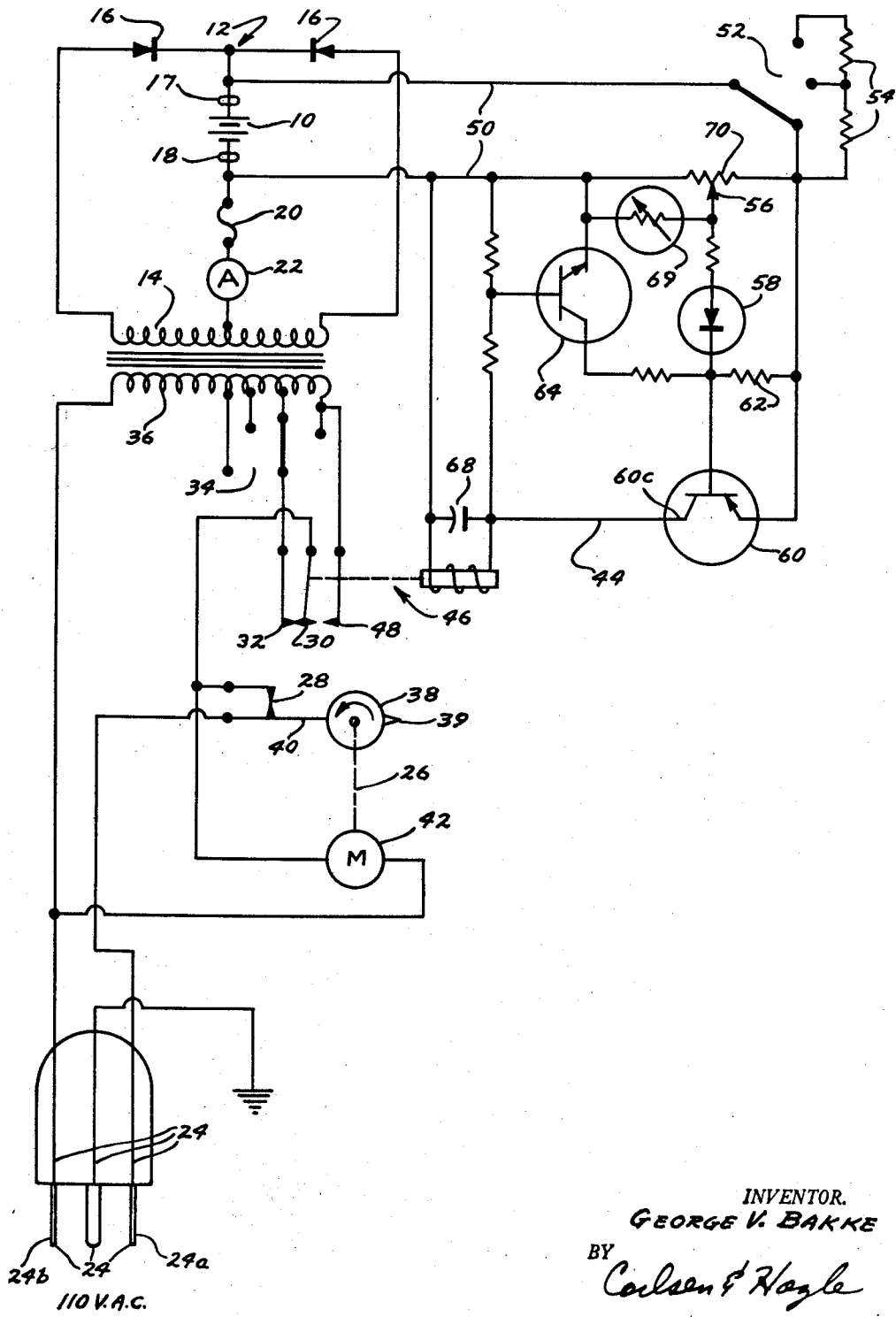

3,081,426
BATTERY CHARGERS
George V. Bakke, Minneapolis, Minn., assignor, by mesne assignments, to Marquette Corporation, Minneapolis, Minn., a corporation of Delaware
Filed June 4, 1959, Ser. No. 818,111
3 Claims. (Cl. 323—54)

This invention relates generally to battery chargers and more specifically to new and improved semi-automatic controls for battery chargers.

In charging the storage type of batteries it is very important not to overcharge the battery which results in severe damage to the battery plates. Even the so-called trickle charge if applied over an extended period of time can cause damage to batteries. Additionally the ambient temperature in which the battery is charged varies the problem of overcharging over a small but important battery voltage range. Previous battery chargers have provided electro-mechanical and thermo-mechanical devices in attempting to overcome the above stated problems. One of the more common objections to these previous chargers is the failure rate and the variations in the response of the controls.

Accordingly it is an object of this invention to provide in a battery charger a solid-state electronic voltage responsive charge rate control for detecting the degree of battery charge and for changing the charge rate accordingly.

It is a further object of this invention to provide temperature compensation in a battery charger control used to detect degree of battery charge.

It is another object of this invention to provide a timing control in a battery charger control circuit which is operative to protect the battery from trickle overcharge.

These and other more detailed and specific objects will be disclosed in the course of the following specification, reference being had to the accompanying drawings, in which—

The single figure is a schematic diagram of an exemplary embodiment of this invention.

With reference now to the accompanying drawing numeral 10 designates a battery to be electrically charged and connected to a usual battery charging circuit 12. The circuit 12 includes centertapped transformer secondary winding 14 and a pair of semi-conductor or metallic rectifiers 16 at either end thereof arranged to provide a positive full wave rectified current through connectors 17 and 18, battery 10, overcurrent protector 20 and meter 22 to the winding 14 center tap.

Alternating current power for circuit 12 is provided through electric plug 24 which is a three-wire grounded plug adapted to be plugged into a single phase A.C. grounded type receptacle. Terminal 24ª forms one side of the single phase electric connection and is connected through timer 26 normally closed contacts 28 and through normally closed relay contacts 30—32 to the rotor contact of the charging current rate selection switch 34. The stator contacts of the switch 34 are connected to various winding taps of the primary winding 36 of the power input transformer. The one end of the primary 36 is connected to the other side of the 110 v. A.C. single phase line by terminal 24ᵇ.

To charge a battery by the illustrated apparatus the plug 24 is first inserted into a hot electrical receptacle (not shown). The switch 34 is set for the desired charging current rate by switching to the appropriate primary winding tap and a battery 10 is connected between connectors 17—18. To initiate the charging operation timer's 26 manually settable cam 38 is rotated such that its contact arm engaging dog 39 is freed from arm 40 permitting contacts 28 to close. The amount of cam rotation determines the length of time the charger is permitted to operate as will become apparent.

Timer motor 42 gearingly drives timing cam 38 in the direction of the arrow which after a predetermined manually settable time engages contact arm extension 40 to open contacts 28 to shut off the charger and stop motor 42, thus providing a time limited charging operation.

A second automatic voltage sensitive control 44 is provided to operate electro-mechanical relay 46 for moving center arm 30 from normally closed contact 32 which provides a high charging current to normally opened contact 48 to provide a "trickle" or a very low charging current.

Control 44 has a pair of voltage sensing lines 50 respectively coupled to connectors 17 and 18 for sensing the actual battery 10 voltage. When battery 10 voltage reaches a predetermined magnitude the battery is defined as being "fully" charged and the high charging current is automatically reduced to a trickle charge for the remainder of the charging time as determined by timer 26. Should timer 26 turn the charger off prior to the battery being fully charged control 44 will not operate.

One of lines 50 may have a voltage selection switch 52 with voltage dropping resistances 54 for providing the charging of batteries having different voltages. Between terminal 18 and switch 52 there is a potentiometer 56 having its variable voltage tap connected to a voltage threshold circuit including voltage reference device or Zener diode 58 and the emitter-base portion of transistor 60. Initially transistor 60 is in a low conduction or high impedance state. As the battery 10 is charged its voltage increases with the charge providing a continually increasing voltage across voltage divider or potentiometer 56 and likewise an increasing positive voltage across the leg between switch 52 and the potentiometer 56 voltage tap. As Zener diode 58 has its forward current carrying direction opposing the forward current carrying direction of the emitter-base rectifying junction portion of transistor 60 no current flows through either device, the positive voltage being imposed across diode 58 in the reverse direction through resistance 62.

When the Zener or reverse breakdown voltage of diode 58 is reached or exceeded a momentary control actuating reverse current flows therethrough—the action of the circuit herein described is operative to prevent a continuous reverse current. The reverse diode current causes a voltage drop across resistance 62 thereby forward biasing the emitter-base junction of transistor 60 which causes a small base drive current to flow therethrough. PNP transistor 60 collector voltage becomes more positive thereby making the base electrode voltage of a complementary type transistor, such as NPN transistor 64, which is resistively coupled thereto, more positive than the transistor 64 emitter. Transistor 64 collector voltage becomes more negative and is resistively coupled to the transistor 60 base to make its voltage more negative with respect to the transistor 60 emitter causing a greater positive going transistor 60 collector voltage. The circuit action between the two transistors 60 and 64 is cumulative and regenerative to switch both from a low (collector current cutoff) to a high (collector current saturation) conductivity state in a very short period of time. It is seen that the collector voltage excursions of each transistor is operative to provide additional base drive current for the other transistor driving it further toward the collector current saturation. It is apparent that transistors 60 and 64 provide a "latch" or bi-stable circuit having two distinct conductivity states.

The control circuit 44 collector and emitter supply voltages are supplied from the battery being charged, the emitter of transistor 64 being connected to the negative battery connector and the transistor 60 emitter being connected to the battery 10 positive connector. Transistor 64 high conductivity causes the transistor 60 base voltage to become slightly negative with respect to the divider 56 tap voltage forward biasing diode 58 thereby removing control of the circuit from the diode. The transistor 60 is operative when made highly conductive to energize the relay 46 coil moving center arm 30 from normally closed contact 32 to normally open contact 48 thereby disconnecting the high charging current and providing a trickle charge. The trickle charge is thereafter continuous until self-turn-off timer 26 turns the charger off.

A capacitor 68 is added across the relay 46 coil to absorb voltage spikes from the coil caused by a battery 10 being inserted between connectors 17 and 18. It is well known that transistors, such as transistor 60, have low leakage currents even when the transistor is biased into the so-called collector current cutoff region. When a battery is connected as described the power is first applied to the control 44 causing a rapid but momentary leakage current increase. Without the capacitor 68 the high inductance of the relay 46 coil reflects this transient to provide a minute voltage and current impulse to transistor 64 base electrode sufficient to initiate the described cumulative switching action as heretofore described.

It is desirable to vary the battery 10 "full charge" voltage with ambient temperatures. The warmer the ambient temperature the lower the desired "full charge" battery voltage. Temperature compensation is provided by a thermistor 69 connected between the potentiometer 56 variable voltage tap and the end connected to the transistor 64 emitter electrode. Thermistor 69 is in parallel circuit relation with one leg of the potentiometer and as the thermistor resistance varies inversely proportionally with the ambient temperature the voltage threshold for switching the control 44 as measured between lines 50 also varies inversely with temperature changes. As the ambient temperature becomes warmer thermistor 69 provides less resistance, and therefore there is proportionally more voltage drop across leg 70 of voltage dividing potentiometer 56 resulting in a proportionally less required positive voltage across lines 50 to turn off the high charging current.

With battery 10 fully charged and the timer 26 having turned the charger off, control 44 remains in its highly conductive state and when the timer 26 is reset only a trickle charge is applied to the battery. To reset control 44 battery 10 is removed and a battery not fully charged is connected to terminals 17 and 18. The charging cycle may now be repeated.

It is understood that suitable modifications may be made in the structure as disclosed, provided such modifications come within the spirit and scope of the appended claims. Having now therefore fully illustrated and described my invention what I claim to be new and desire to protect by Letters Patent is:

1. A power supply comprising a pair of power input terminals, a power supply circuit having a pair of connectors and input power transfer transformer with a tapped primary winding, one end of the primary being connected to one of the terminals, switch means including time limiting charging means for connecting and disconnecting the other terminal respectively to and from a primary winding tap, an electronic control operatively connected to said switch means and including a unidirectional current conducting device exhibiting reverse voltage breakdown characteristics, a voltage divider connected between said connectors and to said control for passing control and actuating currents to said control and having an intermediate voltage point, the device being in control current blocking relation to a control circuit portion extending between said point and one divider end, temperature variable resistance means connected between said point and a divider end such that the voltage between said point and the one divider end increases with respect to the voltage between the divider ends proportionally with temperature, and the control being responsive to momentary reverse control current flow through said device for disconnecting the other terminal from said primary tap and reconnecting it to the primary end opposing said one end and including variable impedance means having a portion in parallel circuit to said device and is responsive to said current for reducing the portion impedance to divert the current from said device and permit a continuing control current flow.

2. A power supply comprising a pair of power input terminals, a power supply circuit having a pair of connectors and a power input transformer with a tapped primary winding, one end of the primary being connected to one of said terminals, an electromagnetic relay having normally closed and normally open contacts, a self-turn-off timer operative for a predetermined time to couple the other terminal to one side of said relay contacts, the other side of said contacts being respectively connected to a primary winding tap and to the primary end opposing said one end, an electronic control operatively connected to said relay for switching the said other terminal connection from the tap to the opposing end, the control including a pair of voltage lines respectively connected to said connectors, a voltage divider having an intermediate voltage take off point and connected between the said lines, a thermistor coupled between the point and a divider one end, a transistor element having base and emitter electrodes and a unidirectional current conducting device exhibiting reverse voltage breakdown characteristics connected in base drive current blocking relation therewith, the two latter elements being connected between said point and the divider other end, a small resistance connected between the base and emitter, the device being responsive to a predetermined voltage between the connectors to change the transistor conductivity, and the control being responsive to said conductivity change and receiving power over the lines for operating said relay and to provide a low impedance across said device for preventing a current from flowing therethrough in the reverse direction.

3. In apparatus of the class above described, the combination comprising: a source of alternating current; transformer means having a primary winding including a plurality of input terminals and a secondary winding; circuit means, including asymmetrical current conducting means, connecting a load means to said secondary winding; circuit means, including switching means connecting said primary winding to said source of alternating current, said switching means being movable for conection to one of said plurality of terminals in response to a source of control signals; impedance means connected in parallel with said load means; and a source of control signal responsive to the current flow through said impedance means, said source of control signal including temperature compensated asymmetrical current conducting means together with circuit means for connecting the input terminals of a first current controlling means in parallel with at least a portion of said impedance means and further circuit means interconnecting the output terminals of said current controlling means in controlling relationship with said switch means and with the input terminals of a second current controlling means and means connecting the output terminals of said second current controlling means in parallel with said asymmetrical current conducting means and in regenerative relationship with said first current controlling means.

References Cited in the file of this patent
UNITED STATES PATENTS

| | | |
|---|---|---|
| 2,751,549 | Chase | June 19, 1956 |
| 2,776,382 | Jensen | Jan. 1, 1957 |
| 2,783,430 | Bower | Feb. 26, 1957 |
| 2,850,694 | Hamilton | Sept. 2, 1958 |
| 2,885,623 | Staufenberg | May 5, 1959 |
| 2,888,633 | Carter | May 26, 1959 |